United States Patent [19]

Rauch, Jr.

[11] Patent Number: 5,381,680
[45] Date of Patent: Jan. 17, 1995

[54] RETRACTABLE WHEEL LOCK ASSEMBLY

[76] Inventor: Joseph J. Rauch, Jr., 22095 County Rd. 117, Rogers, Minn. 55473

[21] Appl. No.: 125,936
[22] Filed: Sep. 23, 1993
[51] Int. Cl.⁶ .......................................... B62H 5/16
[52] U.S. Cl. ..................... 70/226; 188/2 R; 188/74
[58] Field of Search .......... 70/225, 226, 18, 238, 70/228; 188/2 R, 74, 32

[56] References Cited

U.S. PATENT DOCUMENTS

| | | | |
|---|---|---|---|
| 1,315,003 | 9/1919 | Austin | 188/2 R |
| 1,443,009 | 1/1923 | Davis | 70/226 |
| 1,776,935 | 9/1930 | Snyder | 188/32 |
| 2,823,769 | 2/1958 | Gamble | 188/2 |
| 2,841,250 | 7/1958 | Osborn | 188/2 |
| 2,918,134 | 12/1959 | Jensen | 188/74 |
| 2,944,636 | 7/1960 | Rockwell | 188/29 |
| 3,059,728 | 10/1962 | McKuskie | 188/2 |
| 3,085,285 | 4/1963 | Morlik | 188/74 |
| 3,395,778 | 8/1968 | Shelby | 188/20 |
| 3,548,975 | 12/1970 | Herndon | 188/74 |
| 3,695,394 | 10/1972 | Carpenter | 188/32 |
| 3,712,424 | 1/1973 | Swan | 188/74 |
| 3,722,631 | 3/1973 | Lowrie | 188/32 X |
| 3,760,906 | 9/1973 | McGee | 188/2 R X |
| 4,148,378 | 4/1979 | Alford | 188/74 |
| 4,694,936 | 9/1987 | Jackson | 188/2 |
| 4,828,076 | 5/1989 | Fox | 188/32 |
| 4,934,489 | 6/1990 | Jackson | 188/2 |
| 5,158,158 | 10/1992 | Balogh et al. | 188/2 |

*Primary Examiner*—Lloyd A. Gall
*Attorney, Agent, or Firm*—Nawrocki, Rooney & Sivertson

[57] ABSTRACT

A retractable wheel lock assembly for permanent mounting to a vehicle having a pair of proximately spaced tandem wheels. The wheel lock assembly includes a security tube including two tubular members disposed for relative axial movement. Structure is provided for moving the second tubular member from a first, retracted position to a second, extended position relative to the first tubular member. A wedge-like brake member having two angularly spaced surfaces is carried by the second tubular member for movement therewith. Structure is provided for mounting the wheel lock assembly to the frame of the vehicle so that an axial center line of the security tube is generally vertical and the wedge-like brake member is disposed between the tandem wheels of the vehicle such that the angularly spaced surfaces engage a portion of the tread surface of each wheel when the second tubular member is in the second, extended position.

20 Claims, 2 Drawing Sheets

RETRACTABLE WHEEL LOCK ASSEMBLY

TECHNICAL FIELD

The present invention relates to exterior brakes or wheel locks and anti-theft devices for vehicles. More particularly, it is directed to a manually operated, permanently mounted wheel lock and anti-theft device for a vehicle, such as a trailer, having tandem wheels.

BACKGROUND OF THE INVENTION

Devices for locking the wheels of a vehicle are generally known. For example, wheel chocks are commonly used to hold a trailer in place while parked and/or disconnected from the vehicle pulling such trailer. Wheel chocks are wedge-shaped blocks which frictionally fit into the nip between the tread of a tire and the ground. It is, however, recognized that a single wheel chock only prevents movement of the vehicle in one direction; therefore, two chocks would be necessary to prevent both forward and rearward motion.

More elaborate devices for locking the wheels of a vehicle are known. For example, Jackson (U.S. Pat. Nos. 4,694,936 and 4,934,489) discloses designs for exterior brakes for tandem tires. As Jackson recognizes, recreational vehicles, trailers and larger vehicles often have tandem axles and tires, wherein tires on each side of the vehicle are closely spaced, along a fore-and-aft axis, from each other. Usually these tires are from 2 to 12 inches apart at the closest portion of the treads of each tire. It is often desired to park such a vehicle having tandem tires for an extended period of time. During this parking, it is desirable to brake or block the tires against movement, not only for safety against the vehicle rolling, but also for the purpose of securing the vehicle against theft.

Balogh et al. (U.S. Pat. No. 5,158,158), also discloses a more elaborate wheel chock for tandem wheels. The device includes a pair of members used to lock the wheels of a trailer against movement in both forward and rearward directions. The wheel chock disclosed by Balogh et al. includes a pair of wedge-shaped members which can be moved toward and away from each other for engagement with the opposed curved tread surfaces of tires on tandem wheels. In order to move the members, a flexible belt interconnects the wedge-shaped members, wherein the belt is wound onto a shaft as it is turned to move the members closer together. As seen in FIG. 1 of Balogh et al., it is clear that such a wheel chock does not include anti-theft features. The flexible belt is readily accessible and easily cut to remove such a chock. Further, no means for locking such device in place is included.

Jackson, in U.S. Pat. No. 4,694,936, discloses a wheel chock similar to that disclosed by Balogh et al. Upper and lower wedge-shaped members are utilized to fit between tandem wheels of a vehicle. Jackson further discloses a threaded bar, which is rotated to move the wedges together and apart. The bar can be locked against rotation by a padlock extending through a lock tab on the bar. Further, a tamper-free skirt is provided over one surface to deter cutting the bar. It is believed, however, that these anti-theft features are insufficient to secure a trailer or other parked vehicle having tandem wheels against theft. In particular, the single padlock may be cut, or the bar may be accessed from under a locked trailer.

The wheel locks disclosed by Jackson and Balogh et al., in addition to Herndon (U.S. Pat. No. 3,548,975), all utilize a pair of wedge-shaped members which are moved toward and away from each other to engage the tread surface of a pair of tandem wheels. It is noted that these devices are not permanently attached to the vehicle. The lower wedges would interfere with regular vehicle travel on a road or surface. Thus, each device must be carried in a remote location on the vehicle, and moved into position at the time of parking or chocking the wheels of the vehicle or trailer.

Accordingly, the need exists for a permanently mounted wheel lock and anti-theft device for vehicles, such as trailers, having tandem wheels. The wheel lock assembly should include anti-theft features which discourage would-be thieves or prevent such thieves from succeeding in unlocking the wheels. Further, the device should be permanently mounted to the trailer to prevent the need for separate storage and additional effort in locating and installing the device.

The present invention addresses these needs as well as other problems associated with existing wheel locks and anti-theft devices. The present invention also offers further advantages over the prior art and solves problems associated therewith.

SUMMARY OF THE INVENTION

The present invention provides a retractable wheel lock assembly for mounting to a vehicle having a pair of proximally spaced tandem wheels. The tandem wheels have fore-and-aft aligned tread surfaces. The wheel lock assembly is permanently mounted to the trailer so that when the assembly is not locked, the vehicle may be transported over the road without the wheel lock assembly interfering with tire rotation or permitting debris to be trapped between the tires.

The wheel lock assembly of the present invention incorporates anti-theft features to deter a would-be thief from attempting to disengage or remove the assembly. These features include a security tube enclosing the mechanism which raises and lowers a brake member. The security tube prevents access to the mechanism from all sides.

The wheel lock assembly can also include a covered gear box which prevents access to gears for raising and lowering the brake member. A drive mechanism coupling for raising and lowering the brake member can have a socket which is enclosed within a guard. The socket is preferably designed with a special star-shaped pattern that is not operable by other types of wrenches. The guard could include a passage for inserting a padlock through the guard to prevent access to the socket. Thus, a padlock and wrench-specific socket could provide dual security.

The retractable wheel lock assembly incorporates a two-part security tube defining an axial center line for the assembly. The two-part security tube includes a first tubular member having a first end and a second end and a gear box mounting the first tubular member at that member's first end. The first tubular member has an axial passage extending at least partially therethrough.

The two-part security tube can also include a second tubular member having a first end and a second end. The second tubular member also has an axial passage extending at least partially therethrough.

The exterior surface of the second tubular member telescopes within the interior surface of the first tubular member proximate the second end of the first tubular member. The first tubular member thus cooperates with the second tubular member, the second tubular member moving from a first, retracted position to a second, extended position along an axial center line.

Means for moving the second tubular member from its first, retracted position to its second, extended position along the axial center line are provided. In a preferred embodiment, the second tubular member includes an axially threaded surface portion formed in an axial passage therethrough proximate its first end. In this embodiment, the means for moving the second tubular member from its retracted position to its extended position relative to the first tubular member includes a first shaft having axial threads extending from a first end thereof over a portion of the length of the shaft. The shaft operably engages the axially threaded surface portion in the passage of the second tubular member. The first shaft further includes a second end, a portion of the first shaft proximate its second end extending beyond the first end of the first tubular member into a gear box. A first beveled gear is mounted on the second end of the first shaft.

The gear box, in a preferred embodiment, can include a second shaft extending through the gear box generally perpendicular to the first shaft. The second shaft can have a second beveled gear operably engaging the first beveled gear mounted on the first shaft. When the second shaft is rotated, the second tubular member will move axially relative to the first tubular member.

The second shaft can further include a socket formed therein or machined therein for removably receiving a wrench therein to rotate the second shaft. It is preferred that a special socket design, such as a star shape, be utilized so that commercially available wrenches would not be of utility in rotating the second shaft.

The brake member of the present invention is preferably a wedge-like member or trapezoidal shape member having two angularly spaced surfaces. The brake member is secured to the second tubular member for movement therewith from the first, retracted position to the second, extended position.

In a preferred embodiment, a support member having a first leg affixed proximate the second end of the second tubular member is included. The support member further has a second leg spaced from the axial center line and extending axially parallel to the center line over at least a portion of length of the second tubular member in the direction of the first end of the second tubular member.

The brake member having two angularly spaced surfaces is preferably secured to the second leg of the support member for movement therewith from the first, retracted position to the second, extended position. The brake member is preferably pivotally mounted to the support member so that the brake member may rotate to conform to the surfaces of the tandem wheels over an approximately equal surface area on the treads of each tire.

The retractable wheel lock assembly also includes means for mounting the wheel lock assembly to a frame member of the vehicle. When mounted, the axial center line of the security tube is generally vertical, and the brake member is positioned between the tandem wheels. The angularly spaced surfaces can then engage a portion of the tread surface of each wheel when the second tubular member is moved to the second, extended position. The means for permanently mounting the wheel lock assembly can include a bracket secured to the exterior surface of the first tubular member which may then be welded or bolted to the frame of the vehicle. Welding is preferable to prevent theft.

The gear box of the present invention can further include a guard which is mounted over the socket and secured to the gear box. The guard has a first passage therethrough for receiving a wrench. It thus is necessary to insert a wrench through the guard. This prevents turning of the second shaft without the proper wrench. The guard can further include a second passage therethrough which intersects the first passage and can be utilized for receiving the shank of a padlock to block access by any wrench to the socket.

These and various other advantages and features of novelty which characterize the present invention are pointed out with particularity in the claims annexed hereto and forming a part hereof. However, for a better understanding of the invention, its advantages, and the object obtained by its use, reference should be made to the drawings which form a further part hereof, and to the accompanying descriptive matter in which there are illustrated and described preferred embodiments of the present invention.

BRIEF DESCRIPTION OF THE DRAWINGS

In the drawings, in which like reference numerals indicate corresponding parts or elements of preferred embodiments of the present invention throughout the several views.

DETAILED DESCRIPTION OF THE PREFERRED EMBODIMENTS

Detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one of skill in the art to variously practice the invention.

Figure 1:
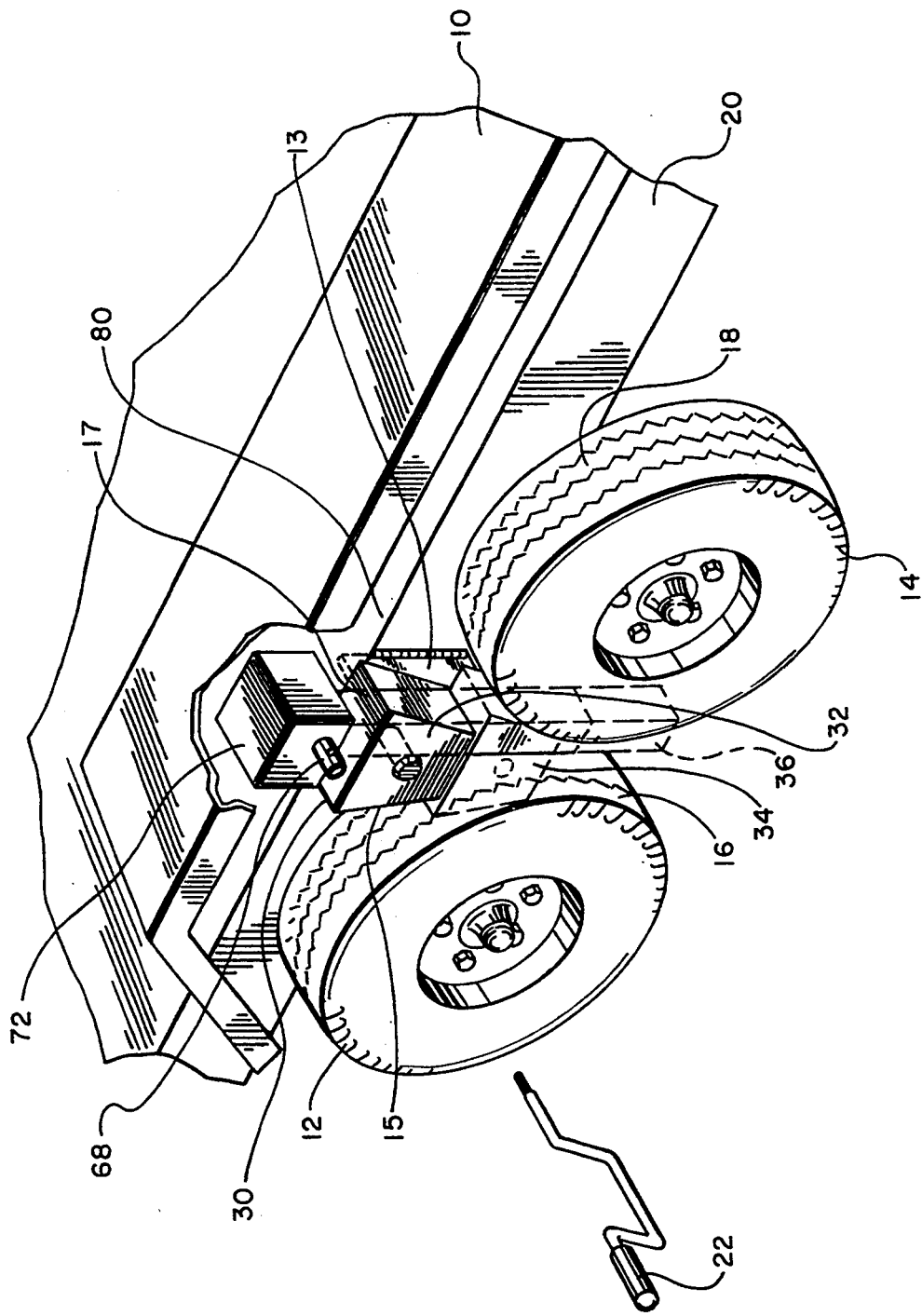
FIG. 1 is a fragmentary perspective view of a fore-and-aft tandem wheel assembly suspended beneath a vehicle frame showing the location and functional overview of the wheel locking device of the present invention.

Referring now to FIG. 1, a fragmentary perspective view of a retractable wheel lock assembly 30 of the present invention is depicted. The wheel lock assembly 30 is permanently mounted to a vehicle 10, having a pair of proximately spaced tandem wheels 12, 14. The pair of wheels 12, 14 have fore-and-aft aligned tread surfaces 16, 18.

Means 80 for mounting the wheel lock assembly 30 to a frame member 20 of the vehicle 10 are included. As illustrated in FIG. 1, the wheel lock assembly 30 is preferably attached to the vehicle or trailer frame member 20 by welds 13 to prevent removal of the wheel lock assembly 30.

The wheel lock assembly 30 includes, generally, a telescoping security tube 36 on which a wedge-like brake member 54 is mounted. As shown in phantom in FIG. 1, the security tube 36 is moveable between a first, retracted position 32 and a second, extended position 34.

As mounted on the frame member 20, the telescoping security tube 36 defines an axial center line which is generally vertical and disposed between the tandem wheels 12, 14. The wedge-like brake member 54 is disposed between the tandem wheels 12, 14. A pair of angularly spaced surfaces 15, 17 on the wedge-like brake member 54 are positioned to frictionally engage corresponding portions of the tread surfaces 16, 18 when the telescoping security tube 36 is moved to the second, extended position 34. In this way, the wheels 12, 14 are prevented from rotation until such time as the telescoping security tube 36 is moved to the first, retracted position 32.

As further disclosed generally in FIG. 1, the retractable wheel lock assembly 30 includes means for moving the mechanism from a first, retracted position 32 to a second, extended position 34. This can include a gear box 72 and associated internal mechanisms described hereinafter. A wrench 22 is provided for operating the mechanism. A guard 68 is preferably included to limit access to the gear box 72 mechanism to the proper wrench 22.

Figure 3:
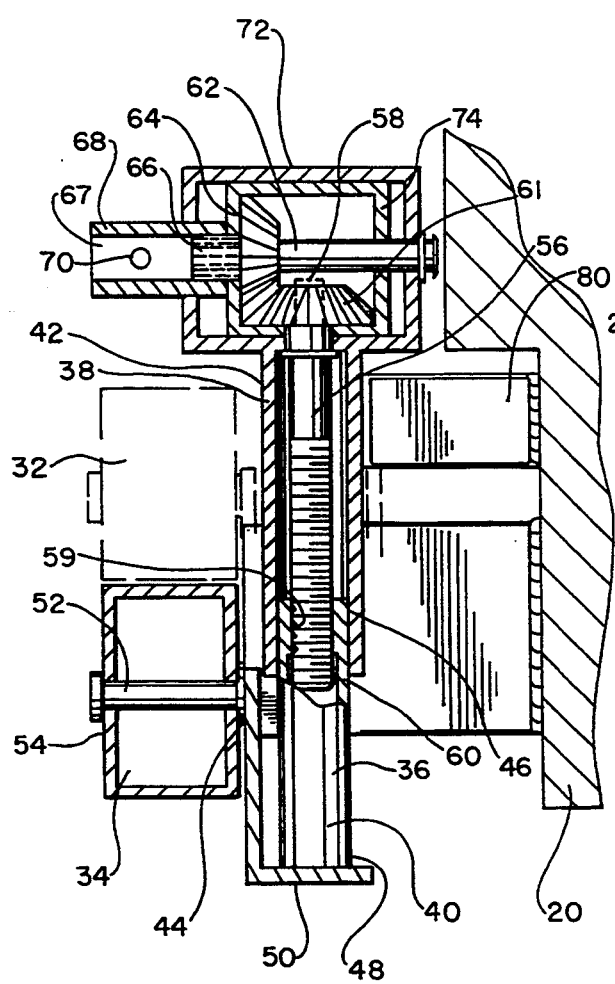
Figure 2:
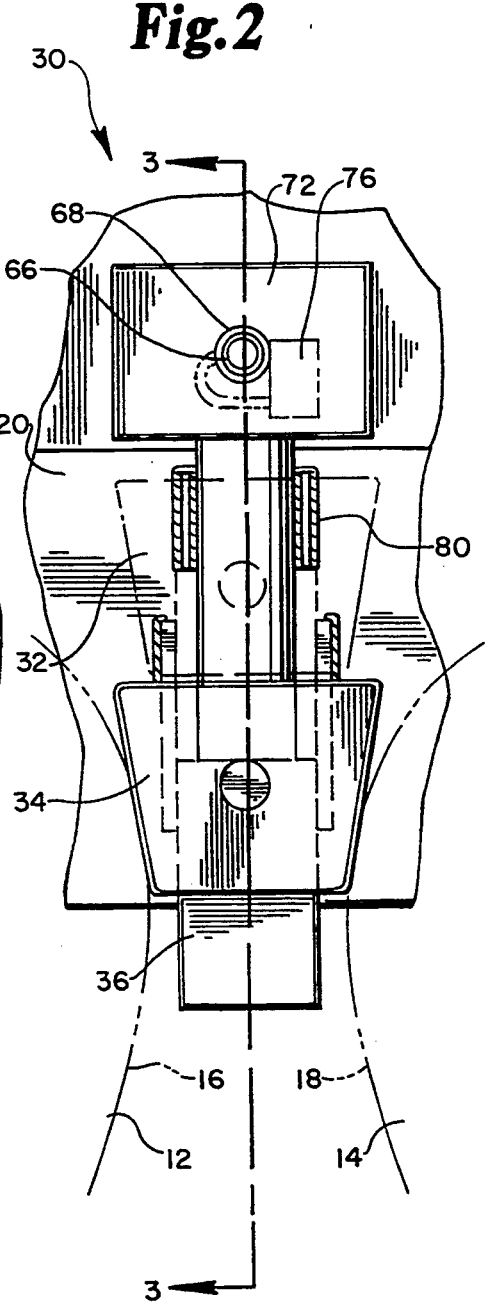
FIG. 2 is a fragmentary side elevational view showing the wheel locking device operating between tandem wheels shown in phantom-line; and, FIG. 3 is a fragmentary sectional view taken generally along line 3—3 of FIG. 2.

Referring now to FIG. 2, a fragmentary side elevational view showing the wheel lock assembly 30 operating between tandem wheels 12, 14 in phantom is illustrated. Referring also to FIG. 3, a fragmentary sectional view taken along line 3—3 of FIG. 2 is depicted. The wheel lock assembly 30 includes the telescoping security tube 36 as previously indicated. The telescoping security tube 36 includes a first tubular member 38 having a first end 42 and a second end 44. The telescoping security tube 36 also includes a second tubular member 40 having a first end 46 and a second end 48.

The first tubular member 38 and the second tubular member 40 are sized so that the first end 46 of the second tubular member 40 is slidably received within the first tubular member 38 proximate the second end 44 of the first tubular member 38 and along an axial center line defined by the length of the security tube 36.

In a preferred embodiment, a gear box 72 is secured to the first end 42 of the first tubular member 38. In this embodiment, the first tubular member 38 has a passage extending axially therethrough, while the second tubular member 40 has an axial passage extending at least through a portion thereof. The tubular members 38, 40 are preferably sized such that the exterior surface of the second tubular member 40 slidably engages the interior surface of the first tubular member 38. The tubular members 38, 40 thus are slidable along the axial centerline extending over substantial portions of their lengths.

The second tubular member 40 preferably also carries an axially threaded surface 59 on the inner wall of the axial passage extending at least partially therealong. The threaded surface 59 on the wall of the passage extends over a portion thereof proximate the first end 46. As previously stated, means for moving the second tubular member 40 from a first, retracted position 32 to a second, extended position 34 along the axial center line of the security tube 36 are provided. A preferred mechanism is depicted in FIG. 3.

A first shaft 56, having axial threads thereon, has a first end 60 on a portion of the length of which threading is provided. The threading on the first shaft 56 operably engages the axially threaded surface 59 on the inside surface of the axial passage through at least a portion of the second tubular member 40.

The first shaft 56 also includes a second end 58 extending beyond the first end 42 of the first tubular member 38 through an opening into the gear box 72. A first beveled gear 61 is mounted to the second end 58 of the first shaft 56.

A second shaft 62 is rotatably mounted through the gear box 72 generally perpendicular to the first shaft 56. The second shaft 62 has a second beveled gear 64 operably engaging the first beveled gear 61, wherein, when the second shaft 62 is rotated, the second tubular member 40 moves axially along the axial center line of the security tube 36 relative to the first tubular member 38.

A socket 66 is machined into, or attached to an end of, the second shaft 62 .for receiving a wrench 22 therein to enable selective rotating of the second shaft 62. In a preferred embodiment, the end of the wrench 22 and the socket 66 are designed with a special mating surface such that standard wrenches would not be able to operate the gear mechanism. For example, a star-shaped socket can be utilized with a matching surface wrench 22.

In a preferred embodiment, a guard 68 is mounted over the socket 66 and secured to the gear box 72. The guard 68 can be a tubular member having a passage extending axially therethrough. The wrench 22 is received through this passage to afford access to the socket 66. The guard 68 prevents access to the socket by means of other than a specific wrench 22. The guard is preferably constructed from stainless steel to inhibit breaking or cutting.

The guard can further include a second passage 70, in a preferred embodiment, which intersects the first passage 67. The second passage 70 is designed for receiving a shank of a padlock 76 therethrough to block access to the socket 66 by any wrench or tool.

The retractable wheel lock assembly 30 of the present invention includes, as previously indicated, a wedge-like brake member 54. The wedge-like brake member 54 has two angularly spaced surfaces 15, 17. The brake member 54 is secured to the second tubular member 40 for movement therewith from the first, retracted position 32 to the second, extended position 34.

In a preferred embodiment, a support member 50, having a first leg affixed proximate a second end 48 of the second tubular member 40, is provided. The support member 50 can be generally L-shaped and further include a second leg spaced from the axial center line and extending parallel to the center line over at least a portion of the length of the second tubular member 40 in the direction of the first end 46 of the second tubular member 40. The wedge-like brake member 54 is secured proximate the second end of the support member 50 for movement therewith from the first, retracted position 32 to the second, extended position 34.

In a preferred embodiment, the wedge-like brake member 54 is a trapezoidal block. The sides of the trapezoid define the angularly spaced surfaces 15, 17. It is, however, recognized that other shapes may be utilized which provide two angularly spaced surfaces, such as a triangular block or two angularly spaced pads mounted on support brackets.

The wedge-like brake member 54 is preferably pivotally mounted to the support member 50 by a pin 52. Because the brake member can pivot on pin 52, the device is self-aligning as it is moved to engage the two tread surfaces 16, 18 of the tires 12, 14. Thus, each angularly spaced surface 15, 17 contacts approximately equal tread surface area on respective tires.

The wheel locking assembly 30 of the present invention is shown mounted to a frame member 20 of a vehicle 10. In a preferred embodiment, bracket 80 is secured to the exterior surface of the first tubular member 38. This bracket may then be welded or bolted to the frame 20. Welding is preferable to prevent removal of the wheel lock assembly 30.

As further depicted in FIG. 3, a secondary gear box 74 may be provided for added security. Further, it is recognized that, in a preferred embodiment, beveled gears are utilized in the gear box 72. As is generally known in the art, other gear configurations can be utilized, such as a worm gear and shaft assembly. Further, it is believed that a hydraulic assembly could be placed within the gear box and function in a similar manner.

New characteristics and advantages of the invention covered by this document have been set forth in the foregoing description. It will be understood, however, that this disclosure is, in many respects, only illustrative. Changes may be made in details, particularly in matters of shape, size, and arrangement of parts, without exceeding the scope of the invention. The scope of the invention is, of course, defined in the language in which the appended claims are expressed.

What is claimed is:

1. A retractable wheel lock assembly for permanent mounting to a vehicle having a pair of proximately spaced tandem wheels, said wheels having fore-and-aft aligned tread surfaces, comprising:
   a. a telescoping security tube having an axial center line, said telescoping security tube including a first tubular member with a first end and a second end, and a second tubular member with a first end and a second end, said first end of said second tubular member being slidably disposed for telescoping movement relative to said first tubular member proximate said second end of said first tubular member;
   b. means for moving said second tubular member from a first, retracted position to a second, extended position;
   c. a brake member having two angularly spaced surfaces, said brake member secured to said second tubular member for movement therewith from said first, retracted position to said second, extended position; and
   d. means for mounting said wheel lock assembly to a frame member of said vehicle, wherein, when mounted, said axial center line of said telescoping security tube is generally vertical and said brake member is disposed between the tandem wheels, and said angularly spaced surfaces engage a portion of the tread surface of each wheel when said second tubular member is moved to said second, extended position.

2. The retractable wheel lock assembly of claim 1, wherein said means for moving said second tubular member from a first, retracted position to a second, extended position include:
   a. a gearbox secured proximate the first end of said first tubular member;
   b. a first shaft having axial threads thereon extending from a first end over a portion of the length thereof operably engaging a threaded surface portion on an inside surface of an axial passage through at least a portion of said second tubular member, said first shaft further having a second end extending beyond the first end of said first tubular member through an opening into said gearbox and having a first beveled gear mounted thereon; and
   c. a second shaft rotatably mounted through said gearbox generally perpendicular to said first shaft, said second shaft having a second beveled gear operably engaging said first beveled gear, wherein, when said second shaft is rotated, said second tubular member moves axially relative to said first tubular member, said second shaft having a socket for removably receiving a wrench therein to rotate said second shaft.

3. The retractable wheel lock assembly of claim 2, wherein said gearbox further includes a guard, said guard mounted proximate said socket secured to said gearbox and having a first passage. Therethrough for receiving a wrench.

4. The retractable wheel lock assembly of claim 3, wherein said guard further includes a second passage therethrough intersecting said first passage for receiving the shank of a padlock therethrough to block access to a wrench to said socket.

5. The retractable wheel lock assembly of claim 1 wherein said brake member is a trapezoidal block with the sides of said trapezoid forming said angularly spaced surfaces.

6. The retractable wheel lock assembly of claim 5 wherein said brake member is pivotally secured to one end of a support member, the other end of said support member being secured to said second end of said second tubular member.

7. The retractable wheel lock assembly of claim 1, wherein said means for mounting said wheel lock assembly to a frame member of said vehicle includes a bracket secured to an exterior surface of said first tubular member.

8. A retractable wheel lock assembly for permanent mounting to a vehicle having a pair of proximately spaced tandem wheels, said wheels having fore-and-aft aligned tread surfaces, comprising:
   a. a telescoping security tube having an axial center line, said security tube including a first tubular member having a first end, secured to a gearbox, a second end, and a passage extending axially therethrough, and a second tubular member having a first end, a second end, and a passage extending axially therethrough, an exterior surface of said second tubular member slidably engaging the interior surface of said first tubular member proximate said second end of said first tubular member, said second tubular member further having an axially threaded surface, on an inner wall defining said passage therethrough, over a portion thereof proximate said first end of said second tubular member;
   b. means for moving said second tubular member, relative to said first tubular member, from a first, retracted position to a second, extended position, said means including a first shaft having axial threads extending from a first end thereof over a portion of the length thereof, said axial threads operably engaging said axially threaded surface in said passage of said second tubular member, said first shaft further having a second end extending beyond the first end of said first tubular member into said gearbox and having a first beveled gear mounted thereon;
   c. a second shaft extending through said gearbox generally perpendicular to said first shaft, said second shaft having a second beveled gear operably engaging said first beveled gear, wherein, when said second shaft is rotated, said second tubular member moves axially relative to said first tubular member, said second shaft having a socket therein for removably receiving a wrench to rotate said second shaft;

d. a brake member having two angularly spaced surfaces, said brake member secured to said second tubular member for movement therewith from said first, retracted position to said second, extended position; and e. means for mounting said wheel lock assembly to a frame member of said vehicle wherein, when mounted, said axial center line of said telescoping security tube is generally vertical and said brake member is disposed between said tandem wheels and said angularly spaced surfaces engage a portion of the tread surface of each wheel when said second tubular member is moved to said second, extended position.

9. The retractable wheel lock assembly of claim 8, wherein said gearbox further includes a guard, said guard mounted proximate said socket and secured to said gearbox and having a first passage therethrough for receiving a wrench.

10. The retractable wheel lock assembly of claim 9, wherein said guard further includes a second passage therethrough, intersecting said first passage, for receiving the shank of a padlock therethrough to block access to a wrench to said socket.

11. The retractable wheel lock assembly of claim 8, wherein said brake member is a trapezoidal block with the sides of said trapezoid forming said angularly spaced surfaces.

12. The retractable wheel lock assembly of claim 11, wherein said brake member is pivotally secured to one end of a support member, the other end of said support member being secured to said second tubular member.

13. The retractable wheel lock assembly of claim 8, wherein said means for mounting said wheel lock assembly to a frame member of said vehicle includes a bracket secured to an exterior surface of said first tubular member.

14. A retractable wheel lock assembly for permanent mounting to a vehicle having a pair of proximately spaced tandem wheels, said wheels having fore-and-aft aligned tread surfaces, comprising:

a. a security tube having an axial center line, said security tube including a first tubular member having a first end and a second end and a second tubular member having a first end and a second end, said first end of said second tubular member slidably disposed relative to said first tubular member proximate said second end of said first tubular member;

b. means for moving said second tubular member from a first, retracted position to a second, extended position relative to said first tubular member;

c. a support member having a first leg affixed proximate said second end of said second tubular member, said support member further having a second leg spaced from said axial center line and extending generally parallel to said center line over at least a portion of the length of said second tubular member in the direction of the first end of said second tubular member;

d. a wedge-like brake member having two angularly spaced surfaces, said brake member secured proximate a distal end of said second leg of said support member for movement therewith between said first, retracted position and said second, extended position; and f. means for mounting said wheel lock assembly to a frame member of said vehicle, wherein, when mounted, said axial center line of said security tube is generally vertical and said brake member is disposed between said tandem wheels, said angularly spaced surfaces engaging portions of the tread surface of each wheel when said second tubular member is moved to said second, extended position.

15. The retractable wheel lock assembly of claim 14, wherein said means for moving said second tubular member between said retracted position and said extended position include:

a. a gearbox mounting the first end of said first tubular member;

b. a first shaft having axial threads thereon extending from a first end of said first shaft over a portion of the length thereof, said threads operably engaging an axially threaded surface portion on an inside surface of an axial passage through said second tubular member, said first shaft further having a second end extending beyond the first end of said first tubular member through an opening into said gearbox, and having a first beveled gear mounted thereon; and c. a second shaft rotatably mounted in said gearbox generally perpendicular to said first shaft, said second shaft having a second beveled gear operably engaging said first beveled gear, wherein, when said second shaft is rotated, said second tubular member moves axially relative to said first tubular member, said second shaft having a socket for removably receiving a wrench therein to rotate said second shaft.

16. The retractable wheel lock assembly of claim 15, wherein said gearbox further includes a guard, said guard mounted over said socket and secured to said gearbox and having a first passage therethrough for receiving a wrench.

17. The retractable wheel lock assembly of claim 16, wherein said guard further includes a second passage therethrough intersecting said first passage for receiving the shank of a padlock therethrough to block access by a wrench to said socket.

18. The retractable wheel lock assembly of claim 15, wherein said wedge-like brake member is a trapezoidal block with the sides of said trapezoid forming said angularly spaced surfaces.

19. The retractable wheel lock assembly of claim 15, wherein said wedge-like brake member is pivotally secured to said support member.

20. The retractable wheel lock assembly of claim 14, wherein said means for mounting said wheel lock assembly to a frame member of a vehicle includes a bracket secured to an exterior surface of said first tubular member.

* * * * *